(12) United States Patent
Noble (10) Patent No.: US 9,904,866 B1
(45) Date of Patent: Feb. 27, 2018

(54) ARCHITECTURES FOR OBJECT RECOGNITION

(75) Inventor: Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 517 days.

(21) Appl. No.: 13/529,638

(22) Filed: Jun. 21, 2012

(51) Int. Cl.
*G06K 9/22* (2006.01)
*G06K 9/36* (2006.01)
*G06K 9/32* (2006.01)
*G06T 7/223* (2017.01)

(52) U.S. Cl.
CPC ............ *G06K 9/3241* (2013.01); *G06T 7/223* (2017.01); *G06T 2207/10016* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 2001/0053249 A1* | 12/2001 | Krishnamachari . | G06F 17/3025 382/165 |
| 2004/0022436 A1* | 2/2004 | Patti et al. ...................... | 382/191 |
| 2006/0262962 A1* | 11/2006 | Hull et al. ..................... | 382/103 |
| 2008/0232681 A1* | 9/2008 | Feris et al. ..................... | 382/159 |
| 2009/0324026 A1* | 12/2009 | Kletter ......................... | 382/124 |
| 2009/0324077 A1* | 12/2009 | Wu ................... | G06F 17/30247 382/170 |
| 2012/0109993 A1* | 5/2012 | Reznik ................. | G06K 9/4671 707/765 |
| 2013/0107071 A1* | 5/2013 | Tang et al. ................. | 348/222.1 |

OTHER PUBLICATIONS

Huynh, Quyen Q., et al. "Classification of underwater mammals using feature extraction based on time-frequency analysis and BCM theory." Signal Processing, IEEE Transactions on 46.5 (1998): 1202-1207.*
Zhang, HongJiang, et al. "Image retrieval based on color features: an evaluation study." Photonics East'95. International Society for Optics and Photonics, 1995.*
Lewis, Paul H., et al. "An integrated content and metadata based retrieval system for art." IEEE Transactions on Image Processing 13.3 (2004): 302-313.*
Stricker, Markus, and Alexander Dimai. "Spectral covariance and fuzzy regions for image indexing." Machine vision and applications 10.2 (1997): 66-73.*

* cited by examiner

*Primary Examiner* — Vu Le
*Assistant Examiner* — Tracy Mangialaschi
(74) *Attorney, Agent, or Firm* — Polsinelli LLP (57) ABSTRACT

The accuracy of an image matching and/or object identification process can be improved by utilizing a BCM network-based process that maintains higher order relationships between features in an image. A dataset of images can be converted to floating point vectors and then processed using a BCM-based approach. The resulting vectors can be stored as an image library for purposes of matching subsequently received images. When a match is located for a query image, for example, information associated with the matching image can be provided in order to help identify one or more objects in the received query image.

19 Claims, 6 Drawing Sheets

ARCHITECTURES FOR OBJECT RECOGNITION

BACKGROUND

Users are increasingly utilizing electronic devices to obtain various types of information. For example, a user wanting to determine the availability of a book can capture an image of the book and upload that image to a book identification service for analysis. Conventional approaches, such as principal component analysis-based approaches, attempt to reduce the amount of information needed for matching in order to increase a speed and efficiency of the matching process. Unfortunately, these processes typically lose anything more than first-order relationships between features in a captured image, which can decrease the accuracy of the matching process.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to recognizing objects using an electronic device. In particular, various embodiments provide an improved approach to matching query images against a library or set of images for purposes such as identifying one or more objects in a query image. Various embodiments utilize a BCM network-based approach (the BCM network named for Elie Bienenstock, Leon Cooper, and Paul Munro) that maintains higher order information about the relationships between features in the images. The higher order information improves the ability to accurately map query images against an image library or other such grouping of image content.

Various other functions and advantages are described and suggested below as may be provided in accordance with the various embodiments.

Figure 1:
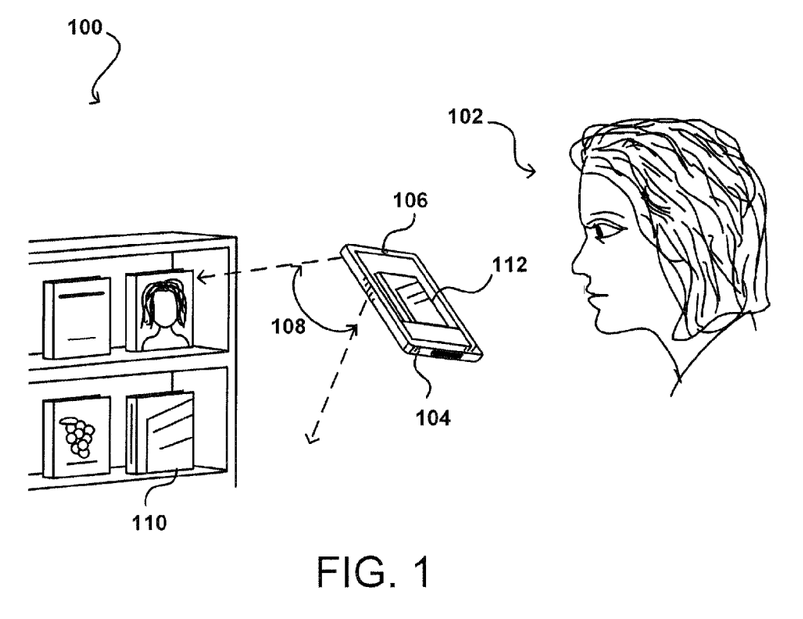
FIG. 1 illustrates an example environment in which aspects of the various embodiments can be that can be utilized.

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players.

In this example, a camera on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to locate one or more elements in a scene to be analyzed. In some embodiments, a user can manually cause image information to be analyzed, while in other embodiments the image information can be analyzed automatically, either on the device or by streaming scene data to a remote system or service as discussed later herein.

Figure 2:
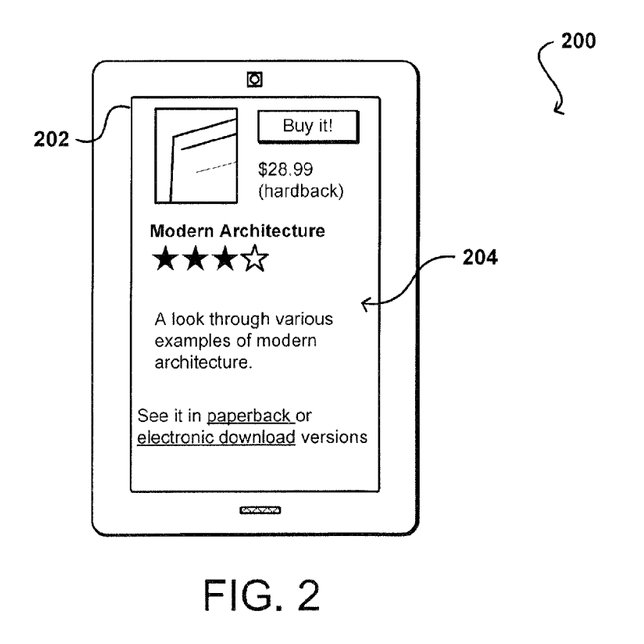
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the scene data using one or more matching or identifying algorithms, or other such approaches. These can include, for example, image recognition algorithms, feature recognition algorithms, facial recognition algorithms, audio pattern recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. Further, the type of information displayed (or otherwise conveyed) can depend at least in part upon the type of content located or matched. For example, a located song might include artist and title information, as well as audio formats in which the song is available. For facial recognition, the information might include name, title, and contact information. Various other types of information can be displayed as well within the scope of the various embodiments.

Figure 3:
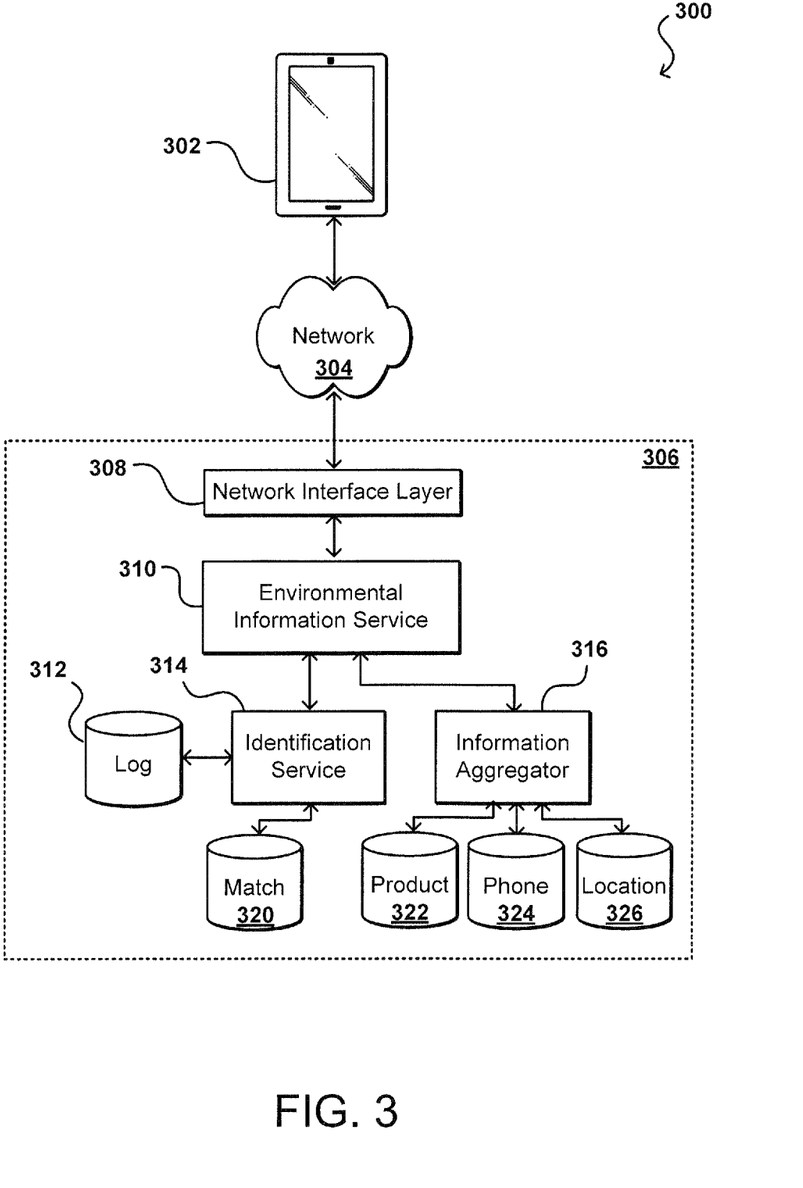
FIG. 3 illustrates example system for identifying elements and providing information that can be utilized in accordance with various embodiments.

As discussed, information such as that illustrated in FIG. 2 can be located by streaming (or otherwise transferring) an image and/or other electronic data to a system or service operable to find one or more potential matches for that data and provide related information for those potential matches. FIG. 3 illustrates an example environment 300 in which such information can be located and transferred in accordance with various embodiments. In this example, a user is able to capture one or more types of information using at least one computing device 302. For example, a user can cause a device to capture audio and/or video information around the device, and can send at least a portion of that audio and/or video information across at least one appropriate network 304 to attempt to obtain information for one or more objects, persons, or occurrences within a detectable vicinity of the device. The network 304 can be any appropriate network, such as may include the Internet, a local area network (LAN), a cellular network, and the like. The request can be sent to an appropriate content provider 306, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of scene data is obtained in order to obtain a set of results. In other embodiments, scene data can be streamed or otherwise transmitted as quickly as possible in order to provide near real-time results to a user of the computing device.

In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as an environmental information service 310 as illustrated in FIG. 3. An environmental information service in this example includes components operable to receive electronic data about an environment, such as the region around a computing device, analyze the data using business logic, and return information relating to people, products, places, or things around the computing device at or around the time of the capture or transmission of that electronic information. For example, an environmental information service can receive information including one or more images of objects near a device, audio information for a song playing near the device, and biometric information for a person holding the device. The environmental information service is capable of recognizing the types of information (e.g., different types of sensor data) and causing each type to be analyzed for purposes of identifying one or more persons, objects, or occurrences in each type of information. In some embodiments, the different types of information might be sent as separate requests, which can be aggregated by the environmental information service 310 for purposes of analysis. The environmental information can also be programmed to aggregate results for each type of information and transmit those results back to a user in response to the initial request.

The environmental information service 310 in this example can cause information to be sent to at least one identification service 314 or system that is operable to attempt to match information for at least one type of data, type of sensor, etc. For example, one identification service might attempt to recognize objects in captured image data, while another identification service might attempt to recognize songs in captured audio data. Various other services, and combinations of services, can be utilized as well within the scope of different embodiments. In at least some embodiments, an identification service 314 will process the received data, such as to extract points of interest or unique features in a captured image, for example, then compare the processed data against data stored in a matching data store 320 or other such location. The data in the matching location data store might be indexed and/or processed to facilitate with matching, as known for such purposes. For example, the data store might include information for unique features in an image instead of a copy of the image itself, which can increase the speed and lower the processing requirements of the matching.

The environmental information service 310 can receive information from each contacted identification service 314 as to whether one or more matches could be found for at least one type of data, and can receive any appropriate information for a located potential match. The information from each identification service can be analyzed and/or processed by one or more applications of the environmental information service, such as to determine data useful in obtaining information for each of the potential matches to provide to the user. For example, an environmental information service might receive bar codes, product identifier, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of elements or information as discussed and suggested elsewhere herein. In such an instance, the information aggregator service 316 can utilize the aggregated data from the environmental information service 310 to attempt to locate products, in a product data store 322 or other such location, which are offered through the marketplace and that match, or are otherwise related to, the located digital entities. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well, such as phone number or yellow page information from a phone information data store 324 or point of interest information from a location data store 326. Various other types of information can be returned as well within the scope of the various embodiments.

The environmental information service 310 then can bundle at least a portion of the information and/or digital entities together to send to the client as part of one or more messages or responses to the original request. In some embodiments, the information from the identification services might arrive at different times, as different types of information might take longer to analyze, etc. In these cases, the environmental information service might send multiple messages to the client device as the information becomes available. The digital entities located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

As mentioned, an architecture such as that described with respect to FIG. 3 can be advantageous over conventional identification services at least for the fact that a user can send various types of data captured or otherwise obtained by a device as a collection of scene data, and can ask for information relating to any object, person, occurrence, or other item or element able to be identified from that scene. The "scene" data can include any appropriate type of data obtained by any sensor or other element of one or more electronic devices. For example, the user might stream information including an amount of video (e.g., five seconds, an amount manually selected by the user, or any other appropriate amount) captured by a video camera, along with a corresponding amount of audio data captured by a microphone of the computing device and/or other information captured by one or more sensors of the same or different types. In some embodiments, audio and video data might be captured by different devices that are able to communicate with each other, or another such arrangement. The information can include other sensor data as well, such as location data from a global positioning system (GPS) element, motion data from an accelerometer or inertial sensor, user identification information from a biometric sensor, and other such information. In at least some embodiments, this additional sensor data can be used to assist with one or more matching algorithms, used to suggest related elements, or other such aspects. In at least some embodiments, the application causing the scene data to be streamed or uploaded can request information pertaining to anything that can be identified from the scene data, including people, products, songs, locations, etc. In this example, the identification services are responsible for identifying the elements in a scene, and the environmental information service is responsible for generating the digital entities or sets of information to be provided to the client device for at least a portion of the identified elements.

It should be understood that, although the identification services are shown to be part of the provider environment 306 in FIG. 3, that one or more of these identification services might be operated by third parties that offer these services to the provider. For example, an electronic retailer might offer an application that can be installed on a computing device for identifying music or movies for purchase. When a user transfers an audio clip, for example, the provider could forward this information to a third party who has software that specializes in identifying songs from audio clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the environmental information service to the client device 302.

After selecting one or more matches, the environmental information service can send digital entities for elements that match the scene information provided by the client device. In at least some embodiments, the client device might subsequently send another request for related digital entities for one or more elements. The digital entities for which to locate related elements can be based on any of a number of different factors, such as content a user is currently viewing, indicted interests of the user, and capacity on the device, among other such factors. In some embodiments where identification services and/or information aggregators have significantly different response times, the search for related elements might be more predictive, based on what the user might want to see in the near future, in order to start the search process earlier and reduce user wait times. Taking such an approach, the digital entities for the related elements can be sent as they are located until all identification services have provided a response. In other embodiments, the environmental information service might wait until a response has been obtained from all contacted identification services, or a maximum wait time has been reached, to send the digital entities together to the client device. Determinations as to how many messages to send and when to send the messages can be based upon any of a number of factors, such as bandwidth restrictions, storage capacity, current loads or traffic volumes, etc.

Similar considerations can be utilized on the client device when determining an amount of scene information to transmit to an environmental information service. For example, a user might set a limit on the amount of audio or video data that can be transferred in order to attempt to limit bandwidth overage charges. In some embodiments, a user might indicate that the device can only stream audio from one microphone, even though multiple microphones might be capturing audio data concurrently. Similarly, the user might indicate that image or video information only be streamed from one camera, even though multiple cameras might concurrently capture information. In at least some embodiments, the device can attempt to determine an "optimal" capture element for which to stream information. For example, the device might be able to determine a user who is speaking through volume or clarity of the audio, image recognition of a person's mouth moving or a user's gaze direction, or other by using other such approaches. Based at least in part upon these determinations, the device can select a camera or microphone facing that direction, closest to that person, etc., in order to attempt to provide scene information that will most likely produce accurate matches. In some embodiments, a user can manually select which audio or video capture element to use to provide information, can select whether to include position and related information, etc.

Based at least in part upon the amount and type of scene data provided, the resulting matches from the environmental information service can also include position information indicating a relative position of the match. For example, if a user is attempting to determine the identity of several people sitting around the room, the device can provide some indication of which person around the room corresponds to each identity. This can be provided graphically by including arranged icons or arrows, for example, or can be based upon orientation information from the client device whereby a user orienting the device towards a certain person can obtain the identity of the person in that direction. Various other options are possible as well, and further information for determining locations of identified objects and persons and displaying related information can be found in co-pending U.S. patent application Ser. No. 13/076,322, filed Mar. 30, 2011, and entitled "View Tracking Image Display," which is hereby incorporated herein by reference.

Various approaches are known and used to analyze images in order to locate images showing similar features. Conventional approaches typically locate various features in an image and extract these features for use in describing the image in a way that requires significantly less data. The data generally can be stored as a histogram vector, feature vector, or other such object including a set of floating point numbers, for example, which can be compared against similar vectors generated for a set of images against which a particular image is to be matched. A distance or similarity function often is used to compare histogram vectors for various images. Approaches for comparing vectors using distance and/or spatial similarity functions are known in the art and, as such, will not be discussed herein in detail.

Conventional systems utilize an approach such as principal component analysis (PCA) to reduce the feature space for feature determination and/or extraction. While a PCA-based approach can be performed with relatively little processing, and thus can be relatively fast, such an analysis tends to lose information beyond a first order relationship between image features. In various approaches, a bag of words (BoW)-type approach can be used wherein a BoW model is generated to represent an image by considering the image as a document with patches or "words" that need to be defined. Features of the image can be determined by performing steps such as feature detection from the patches and description of the detected features, whereby a representative vector is generated. Feature detection can include, for example, a regular grid, interest point, random sampling, or segmentation-based approach as known in the art. Representations of the features, such as feature descriptors, then can be generated that can be robust to factors such as variations in scale, orientation, and intensity of an object in an image. An example of a feature descriptor is a scale-invariant feature transform (SIFT), whereby each patch is converted to a 128-dimensional vector, such that each image is a collection of vectors of the same dimension.

Systems and methods in accordance with various embodiments can utilize a network of BCM neurons for feature extraction from an image, where the BCM approach preserves higher order image statistics when doing dimensionality reduction on a bag of words-type approach. As known in the art, a "BCM" network is named for Elie Bienenstock, Leon Cooper, and Paul Munro. Such an approach can provide for more accurate image matching, and can enable image matching to be more robust to certain types of variation.

Instead of using a principal component analysis (PCA) or similar conventional approach for feature extraction, a BCM-based approach can be used that preserves higher order information. BCM vectors can be used in place of SIFT descriptors in the above described process. As known in the art, the activity of a single neuron can be given by c=m*d, wherein d is the input vector and m is a synaptic weight vector. Properties of a BCM neuron can be determined using a modification threshold as well as a determination function. The modification threshold $\Theta_m$ can be a nonlinear function of the history of activity of the neuron, and the determination function $\phi$ can be used to determine information such as the sign and amount of the modification $\Theta_m$. The synaptic equations are as follows:

$$\frac{dm_i}{dt} = \mu\phi(c, \Theta_m)d_i$$

where $$\Theta_m = E\lfloor(m \cdot d)^2\rfloor$$

and $$\phi(c, \Theta_m) = c(c - \Theta_m).$$

In a lateral inhibition network of nonlinear neurons, the activity of neuron k is given by $c_k = m_k * d$, where $m_k$ is the synaptic weight vector of neuron k. The inhibited activity and threshold is then given by:

$$\tilde{c}_k = \sigma\left(c_k - \eta\sum_{j \neq k} c_j\right),$$

$$\tilde{\Theta}_m = E[\tilde{c}_k^2],$$

For a monotone saturating function a. The projection index for a single neuron then is:

$$R(w_k) = -\left\{\frac{1}{3}E[\tilde{c}_k^2] - \frac{1}{4}E^2[\tilde{c}_k^2]\right\}$$

The total index is the sum over all neurons in the network. The resulting modification equations for a synaptic vector $m_k$ in the network then can be given by:

$$\dot{m}_k = \mu\big[\phi\tilde{c}_k, \tilde{\Theta}_m^k)\sigma'(\tilde{c}_k) - \eta\sum_{j \neq k}\phi(\tilde{c}_j, \tilde{\Theta}_m^j)\sigma'(\tilde{c}_j)\big]d,$$

where $m_k$ is the synaptic weight vector of neuron k, and a is the saturating function, and where the moving mean of the neuron is away from the neighboring neuron. This network is a first order approximation to a lateral inhibition network, using a single step relaxation. The inhibited activity piece of the equation above forces each neuron to converge to an appropriate point. Such a BCM algorithm can produce weight vectors that converge iteratively to fixed points, which can correspond to states of "maximum selectivity." Thus, for a single BCM neuron, the converged weight vector can become orthogonal to all cluster centers except one. The feature set of the BCM algorithm can be formed by the convolutions of the weight vectors with the unknown data. An array of feature cells can then be constructed in which the same feature is not selected more than once, and all extracted features of an image are represented in an orderly fashion.

When attempting to perform such feature extraction on an image in accordance with at least one embodiment, an efficient coordinate system can be selected in order to transform the image data to a preliminary feature space. A network of connected k BCM neurons can be constructed, and the BCM neurons can be trained on the transformed image data to produce k weight vectors. An extraction of k features can be performed, which involves determining the output of the k weight vectors on the transformed image data, and the k features can then be provided as inputs to a classifier.

Figure 4:
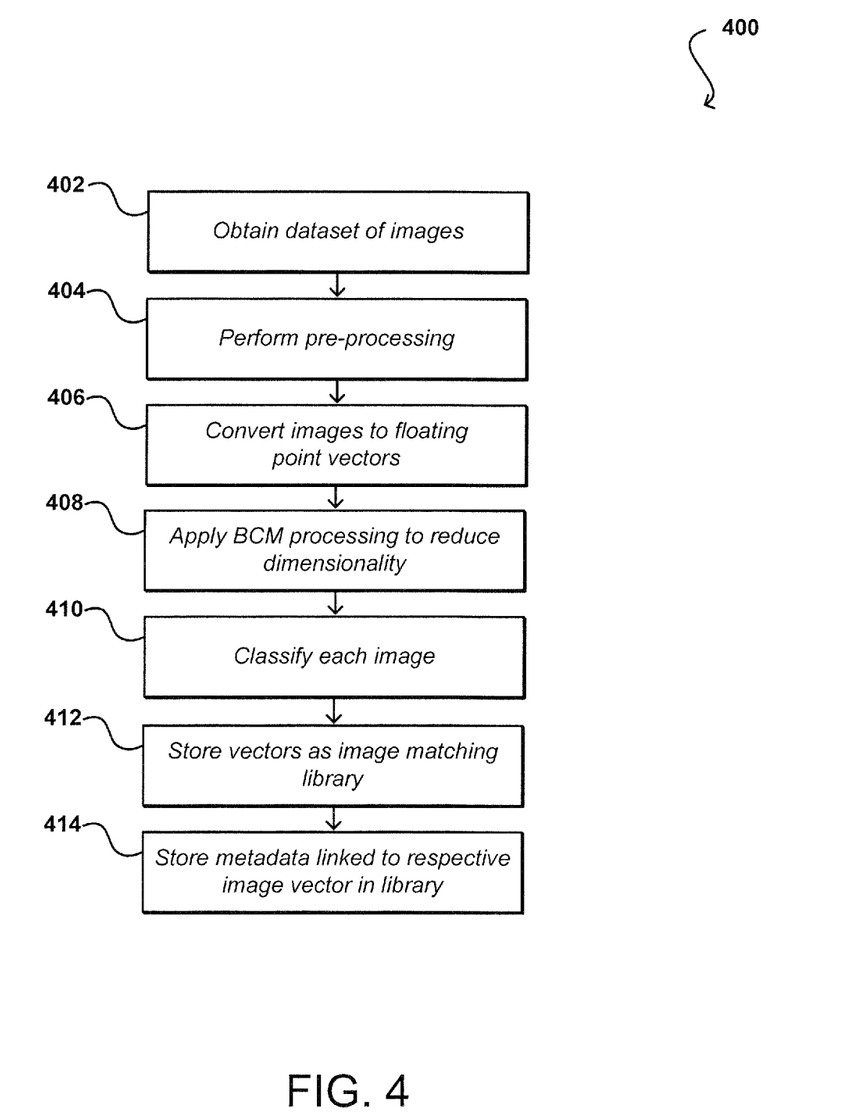
FIG. 4 illustrates an example process for determining histogram vectors for a library of images that can be used in accordance with various embodiments.

FIG. 4 illustrates an example process 400 for generating a library of image vectors that can be utilized in accordance with various embodiments. It should be understood that there can be additional, fewer, or alternative steps performed in similar or alternative orders, or in parallel, within the scope of the various embodiments unless otherwise stated. In this example, a dataset of images is obtained 402 that is to be used for matching. In many embodiments, the images also will have metadata or other information relating to one or more objects indicated in the images, such as titles or identities of persons, places, or things represented in the images. As mentioned, a set of algorithms can be used to extract k features from each image for use in generating a histogram vector for that image, in order to generate a library of histogram vectors for image matching and, ultimately, object identification. In this example, each image can go through any appropriate pre-processing 404 known in the imaging arts, such as to adjust a scale, resolution, size, color level, brightness, or other such aspect, although feature descriptors generally have at least some tolerance for such factors. After any pre-processing, each image can be converted to a floating point vector 406. The conversion can be accomplished using a number of different approaches. For example, the raw image data can be used to generate a long image vector, or a global filter can be used to reduce the size of the image and then generate a shorter image vector. Various filters can alternatively be applied to the image, such as a Histogram of Oriented Gradients (HOG) descriptor and/or template intensity for an image, with a vector then being generated using the resulting data. These approaches can be used on the image as a whole, or at different levels of detail by splitting the image into a number of sub-images, which can be treated as separate images in some embodiments.

A BCM network-based approach then can be applied 408 to these vectors in order to reduce the dimensionality. A conventional approach might use PCA to process the vectors, although random forests and other such processes have been used as well. A BCM-based process, however, can preserve the higher order statistics as discussed. Each image can then be classified 410 using a standard method, such as may include a Random Forest, a support vector machine (SVM), Neural Network, Extremely Random Forest, or k-nearest neighbor (k-NN) look up method. The preservation of the higher order statistics can allow for more accurate classification using these methods. More accurate classification and retaining of higher order relationships can increase the ability of an identification system to recognize objects. The set of floating point vectors then can be stored 412 for subsequent matching processes. Metadata for the images also can be stored and linked 414 to the vectors, in order to provide information about objects in one of the images upon the corresponding image vector matching a query image or other such request.

In such a process, an image can be received to be added to the library, and a set of floating point numbers generated. This set or vector then can be passed to an appropriate machine learning algorithm as known for such purposes. In one example, an image with a resolution of 400×400 pixels can have 16,000 numbers or bytes of information, but after passing through a BCM network the output vector might include something on the order of 100 floating point numbers, which can significantly reduce the amount of time needed to attempt to match this image information against that of another image.

Figure 5:
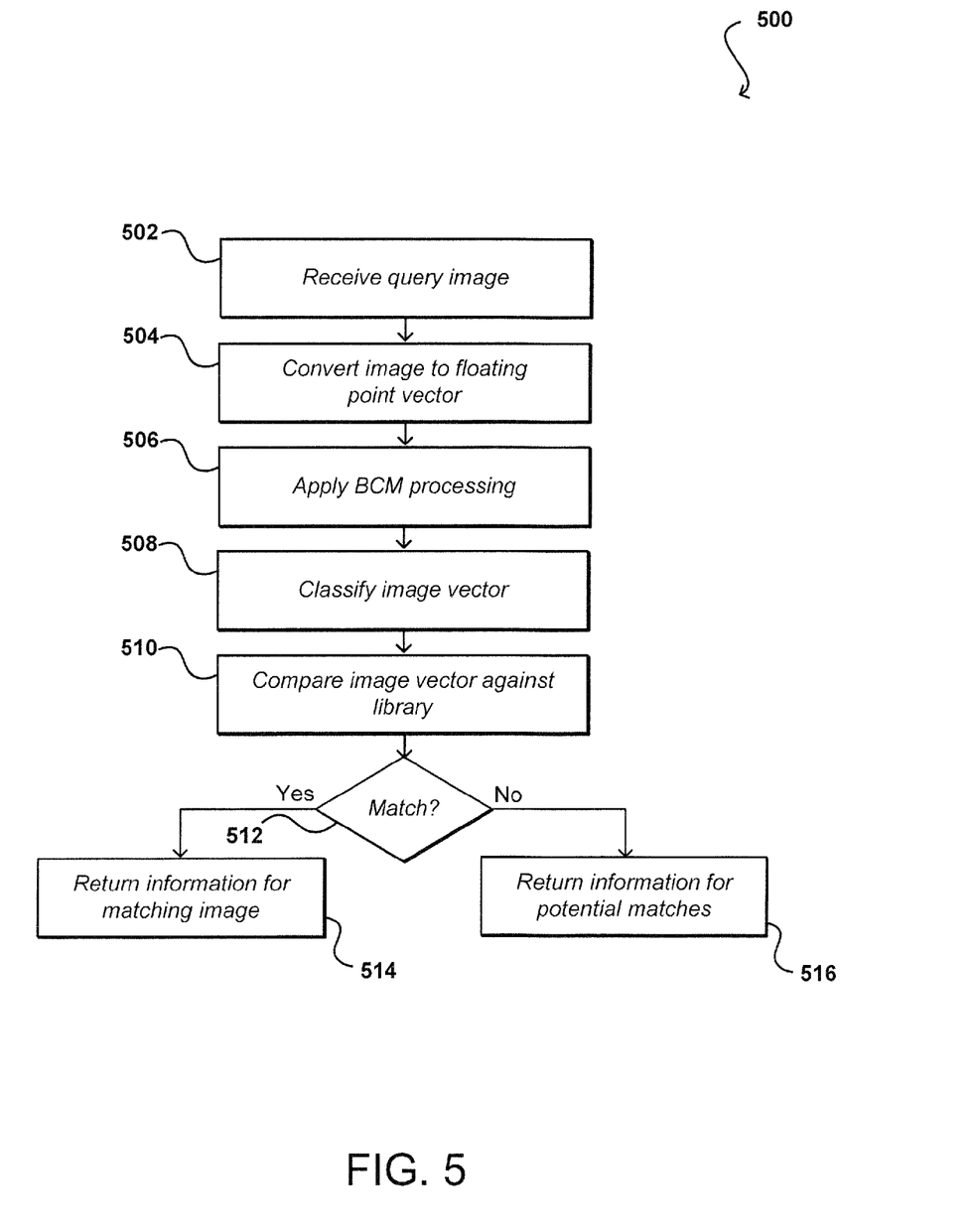
FIG. 5 illustrates an example process for identifying an object in an image using the library generated in a process such as that illustrated in FIG. 4.

FIG. 5 illustrates an example process 500 wherein the an image library such as that generated in FIG. 4 can be used to match a query image in accordance with various embodiments. In this example, a query image is received 502 from a user or other such source. The query image in some cases can be an image captured by the user using a portable computing device, where the user wants to obtain information about one or more objects represented in the image. The image could also be received as part of a search request or through another such mechanism. In this example, the image is converted 504 to a floating point vector as discussed above. The image can also undergo any amount of pre-processing as discussed elsewhere herein. A BCM network-based approach can be applied 506 to these vectors in order to reduce the dimensionality, and the image can be classified 508 as appropriate. A resulting histogram vector or set of floating point numbers for the query image then can be compared 510 against the corresponding vectors in the image library. If at least one match can be found 512 with at least a minimum level of certainty or confidence, for example, information and/or metadata stored for the matching image(s) can be returned 514 to the user as match information. As discussed above, information or content related to an item or object in the matching image can be provided in response to locating a match as well. If a match cannot be determined with at least a minimum level of confidence, information for one or more of the closest matches can be provided 516 such that the user can determine whether any of the results provide that which the user is seeking. Various other approaches can be used as well within the scope of the various embodiments.

In at least some embodiments, information for elements identified using an environmental information service or other such entity can be utilized by other providers as well for any of a variety of purposes. For example, an electronic retailer might recommend products that might be of interest to a user. These recommendations are often selected by looking at the types of elements the user has viewed and/or purchased through an electronic marketplace associated with the retailer. In at least some embodiments, the information for elements selected by the user for identification can be used to recommend elements or content through an electronic marketplace or content repository. For example, if a user identifies a book relating to a particular type of car, that information might be used to recommend products for that type of car to a user, where those products might include accessories for that type of car and not just books relating to that type of car. Similarly, if a user goes to an electronic content delivery site the user might see recommendations for articles on that type of car, or even cars in general. In at least some embodiments, the digital entities can act like keywords used by conventional recommendations engines to recommend content that will potentially be of interest to a particular user. In some cases a separate module on a site or page might include information for elements identified using an information service, for example, instead of incorporating that information into the main content of a page, etc.

Figure 6:
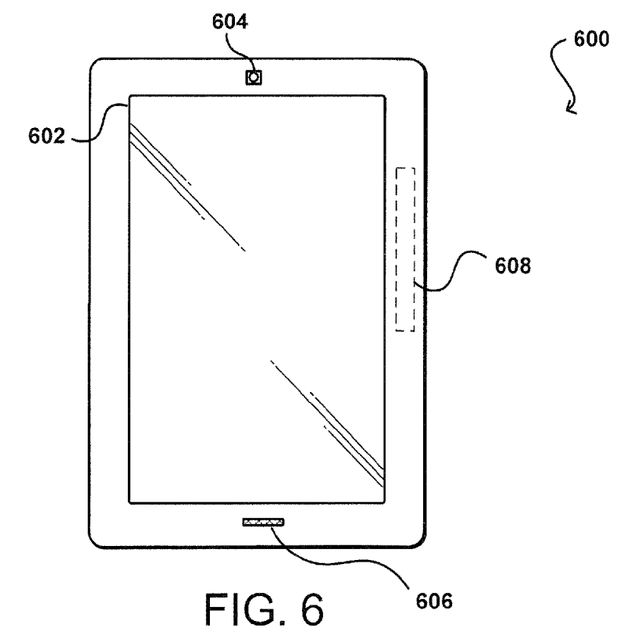
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 7:
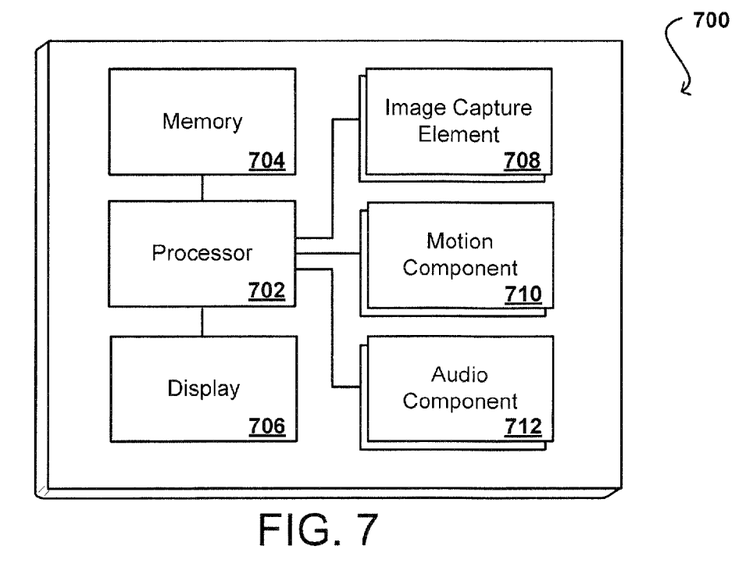
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 712, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
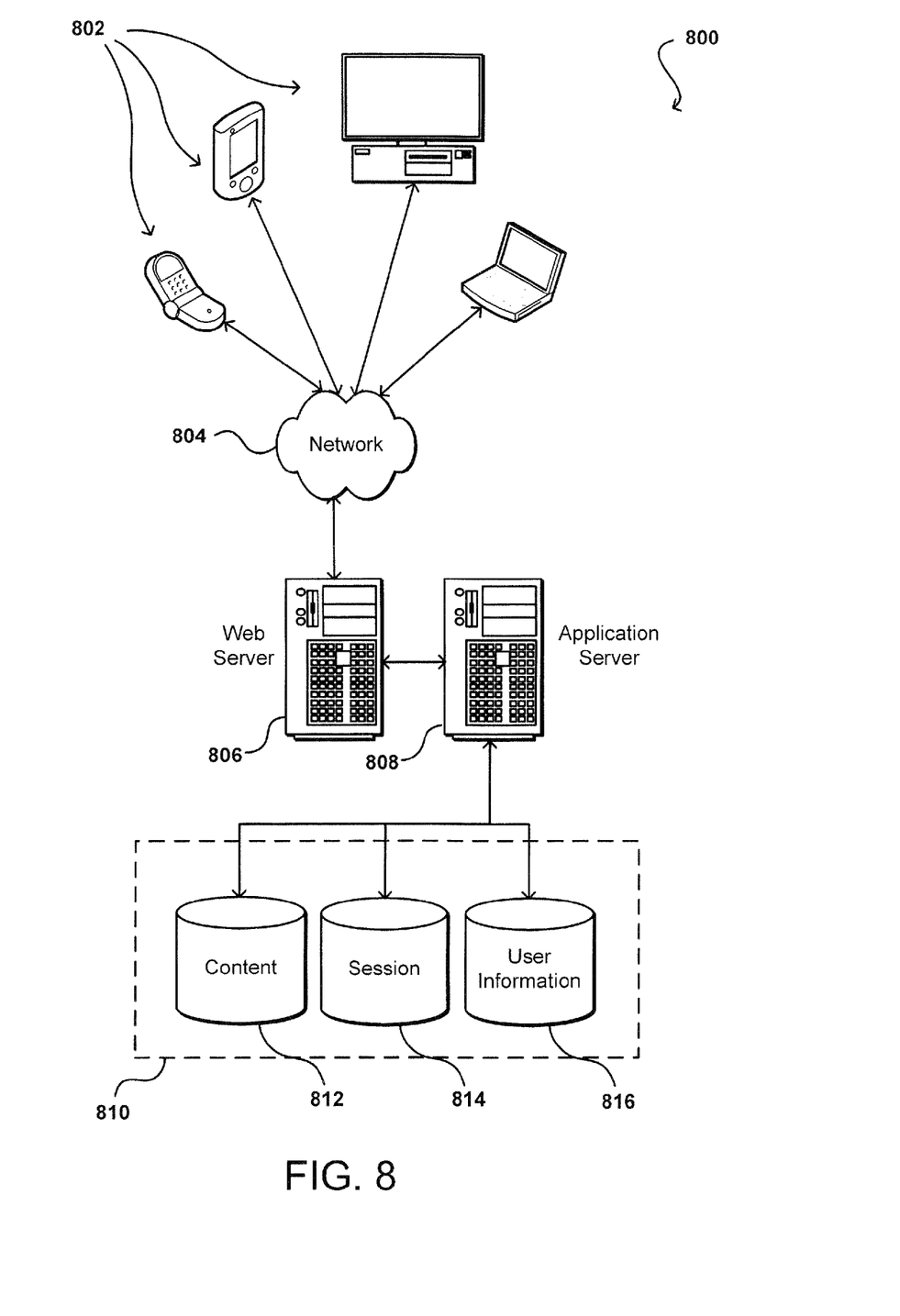
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of identifying an object in an image, comprising:
   receiving a query image from a computing device, the query image being captured using a camera of the computing device;
   generating from the query image a plurality of sub-images, the sub-images being separate images; and
   for a first sub-image of the plurality of sub-images:
   applying a Histogram of Oriented Gradients (HOG) descriptor on the first sub-image to filter the first sub-image;
   generating a pre-processed sub-image by at least one of adjusting image scale, adjusting image resolution, adjusting image size, adjusting image color level, or adjusting image brightness;
   generating a first vector from the pre-processed sub-image, the first vector comprising at least one of a histogram vector or a floating point vector;
   processing the first vector using a Bienenstock, Cooper, and Munro (BCM) network algorithm to produce a reduced dimensionality second vector, by at least analyzing weight vectors that converge iteratively to fixed points;

determining a classification of the reduced dimensionality second vector using at least one of a random forest algorithm, a support vector machine (SVM) algorithm, a neural network, an extremely random forest algorithm, or a k-nearest neighbor (k-NN) look-up algorithm;

using at least the classification of the reduced dimensionality second vector, comparing the reduced dimensionality second vector against image vectors for a plurality of potential match images; and providing information associated with a first match image of the plurality of potential match images when a first image vector for the first match image is determined to match the second vector with at least a minimum level of certainty.

2. The computer-implemented method of claim 1, wherein the information includes metadata associated with the at least one of the plurality of potential match images.

3. The computer-implemented method of claim 1, wherein processing the first vector using the BCM network algorithm includes constructing a network of connected BCM neurons.

4. The computer-implemented method of claim 3, further comprising:
training the BCM neurons on the first vector to produce a determined number of weight vectors.

5. The computer-implemented method of claim 1, wherein generating the first vector includes using image data to generate a long image vector.

6. The computer-implemented method of claim 1, further comprising:
using a global image filter to generate a reduced-size sub-image from the pre-processed sub-image; and
generating a shorter image vector based on the reduced-size sub-image.

7. A computing device, comprising:
at least one processor; and
a memory device including instructions that, when executed by the processor, cause the computing device to:
receive a query image;
generate from the query image a plurality of sub-images; and
for a first sub-image of the plurality of sub-images:
apply a Histogram of Oriented Gradients (HOG) descriptor on the first sub-image to filter the first sub-image;
generate a pre-processed sub-image by at least one of adjusting image scale, adjusting image resolution, adjusting image size, adjusting image color level, or adjusting image brightness;
generate a first vector from the pre-processed sub-image, the first vector comprising at least one of a histogram vector or a floating point vector;
process the first vector using a Bienenstock, Cooper, and Munro (BCM) network algorithm to generate a reduced dimensionality second vector, by at least analyzing weight vectors that converge iteratively to fixed points;
determine a classification of the reduced dimensionality second vector using at least one of a random forest algorithm, a support vector machine (SVM) algorithm, a neural network, an extremely random forest algorithm, or a k-nearest neighbor (k-NN) look-up algorithm;
use at least the classification of the reduced dimensionality second vector to compare the reduced dimensionality second vector against a library of image vectors, a first image vector corresponding to a first match image of a plurality of match images; and
provide information associated with the first match image when the first image vector is determined to match the reduced dimensionality second vector.

8. The computing device of claim 7, wherein generating the reduced dimensionality second vector includes constructing a network of connected BCM neurons.

9. The computing device of claim 8, wherein the instructions when executed further cause the computing device to:
train the BCM neurons on the first vector to produce a determined number of weight vectors.

10. The computing device of claim 7, wherein generating the first vector includes identifying a set of features of the query image.

11. A computer-implemented method, comprising:
receiving a query image from a computing device;
generating from the query image a plurality of sub-images; and
for a first sub-image of the plurality of sub-images:
applying a Histogram of Oriented Gradients (HOG) descriptor on the first sub-image to filter the first sub-image;
generating a pre-processed sub-image, by at least one of adjusting image scale, adjusting image resolution, adjusting image size, adjusting image color level, or adjusting image brightness;
generating a first vector from the pre-processed sub-image, the first vector comprising at least one of a histogram vector or a floating point vector;
processing the first vector using a Bienenstock, Cooper, and Munro (BCM) network algorithm to generate a reduced dimensionality second vector;
determining a classification of the reduced dimensionality second vector using at least one of a random forest algorithm, a support vector machine (SVM) algorithm, a neural network, an extremely random forest algorithm, or a k-nearest neighbor (k-NN) look-up algorithm;
using at least the classification of the reduced dimensionality second vector, comparing the reduced dimensionality second vector against a library of image vectors, a first image vector corresponding to a first match image of a plurality of match images; and
providing information associated with the first match image when the first image vector is determined to match the reduced dimensionality second vector.

12. The computer-implemented method of claim 11, wherein generating the reduced dimensionality second vector includes constructing a network of connected BCM neurons.

13. The computer-implemented method of claim 12, further comprising:
training the BCM neurons on the first vector to produce a determined number of weight vectors.

14. The computer-implemented method of claim 11, wherein generating the first vector includes identifying a set of features of the query image.

15. The computer-implemented method of claim 11, further comprising:
determining that none of the plurality of match images matches the reduced dimensionality second vector with at least a minimum level of confidence.

16. A non-transitory computer-readable storage medium including instructions that, when executed by at least one processor of a computing device, cause the computing device to:

receive a query image;
generate from the query image a plurality of sub-images; and
for a first sub-image of the plurality of sub-images:
apply a Histogram of Oriented Gradients (HOG) descriptor on the first sub-image to filter the first sub-image;
generate a pre-processed sub-image by at least one of adjusting image scale, adjusting image resolution, adjusting image size, adjusting image color level, or adjusting image brightness;
generate a first vector from the pre-processed sub-image, the first vector comprising at least one of a histogram vector or a floating point vector;
process the first vector using a Bienenstock, Cooper, and Munro (BCM) network algorithm to generate a reduced dimensionality second vector, by at least analyzing weight vectors that converge iteratively to fixed points;
determine a classification of the reduced dimensionality second vector using at least one of a random forest algorithm, a support vector machine (SVM) algorithm, a neural network, an extremely random forest algorithm, or a k-nearest neighbor (k-NN) look-up algorithm;
use at least the classification of the reduced dimensionality second vector to compare the reduced dimensionality second vector against a library of image vectors, a first image vector corresponding to a first match image of a plurality of match images; and
provide information associated with the first match image when the first image vector is determined to match the reduced dimensionality second vector.

17. The non-transitory computer-readable storage medium of claim 16, wherein generating the reduced dimensionality second vector includes constructing a network of connected BCM neurons.

18. The non-transitory computer-readable storage medium of claim 17, wherein the instructions when executed further cause the computing device to:
train the BCM neurons on the first vector to produce a determined number of weight vectors.

19. The non-transitory computer-readable storage medium of claim 16, wherein generating the first vector includes identifying a set of features of the query image.

* * * * *